United States Patent

Burton et al.

[15] 3,673,575

[45] June 27, 1972

[54] MICROPROGRAMMED COMMON CONTROL UNIT WITH DOUBLE FORMAT CONTROL WORDS

[72] Inventors: Paul T. Burton, Sunnyvale; Walter E. Cole, San Jose, both of Calif.; Henry E. Frassetto, Jr., Endicott, N.Y.; Robert G. Gibson, Binghamton, N.Y.; Allan Greenberg, Poughkeepsie, N.Y.; Louis E. Handloff, San Jose, Calif.; Raymond Radlinsky, Endwell, N.Y.

[73] Assignees: International Business Machines Corporation, Armonk, N.Y.

[22] Filed: June 29, 1970

[21] Appl. No.: 50,408

[52] U.S. Cl. ....... 340/172.5

[51] Int. Cl. ....... G06f 9/00

[58] Field of Search ....... 340/172.5; 235/157

[56] References Cited

UNITED STATES PATENTS

| | | | |
|---|---|---|---|
| 3,408,630 | 10/1968 | Packard et al. | 340/172.5 |
| 3,513,446 | 5/1970 | Cotton et al. | 340/172.5 |
| 3,346,727 | 10/1970 | Lethin et al | 340/172.5 |
| 3,337,854 | 8/1967 | Cray et al. | 340/172.5 |
| 3,477,063 | 11/1969 | Anderson et al | 340/172.5 |
| 3,377,620 | 4/1968 | Sims | 340/172.5 |
| 3,422,405 | 1/1969 | Packard et al. | 340/172.5 |

*Primary Examiner*—Paul J. Henon
*Assistant Examiner*—Mark Edward Nusbaum
*Attorney*—Hanifin and Jancin and Sughrue, Rothwell, Mion, Zinn & Macpeak

[57] ABSTRACT

A microprogrammed common control unit for effecting the transfer of data between I/O (input/output) devices and the main storage unit of a data processing system, uses both long format control words and short format control words, the short words having half as many bit positions as the long words in the preferred embodiment, thereby minimizing the size of control storage required.

Addressing of the control storage unit effects readout of one long word or a pair of short words. Predetermined bits in each control word cause transfer of a first part (half) of the next accessed long word or either one of a next accessed pair of short words to a control register for execution. If a long word has been accessed, one of said bits is effective during execution of the first part of the long word to initiate the transfer of the second word to the control register for execution after the termination of the execution of the first part of the word.

Consecutive decode of the first and second portions of a long word permits a smaller control register and substantial sharing of decode circuits by different long format control word fields entered into at least partially corresponding positions of the control register, thereby effecting substantial economies.

6 Claims, 1 Drawing Figure

PATENTED JUN 27 1972 3,673,575
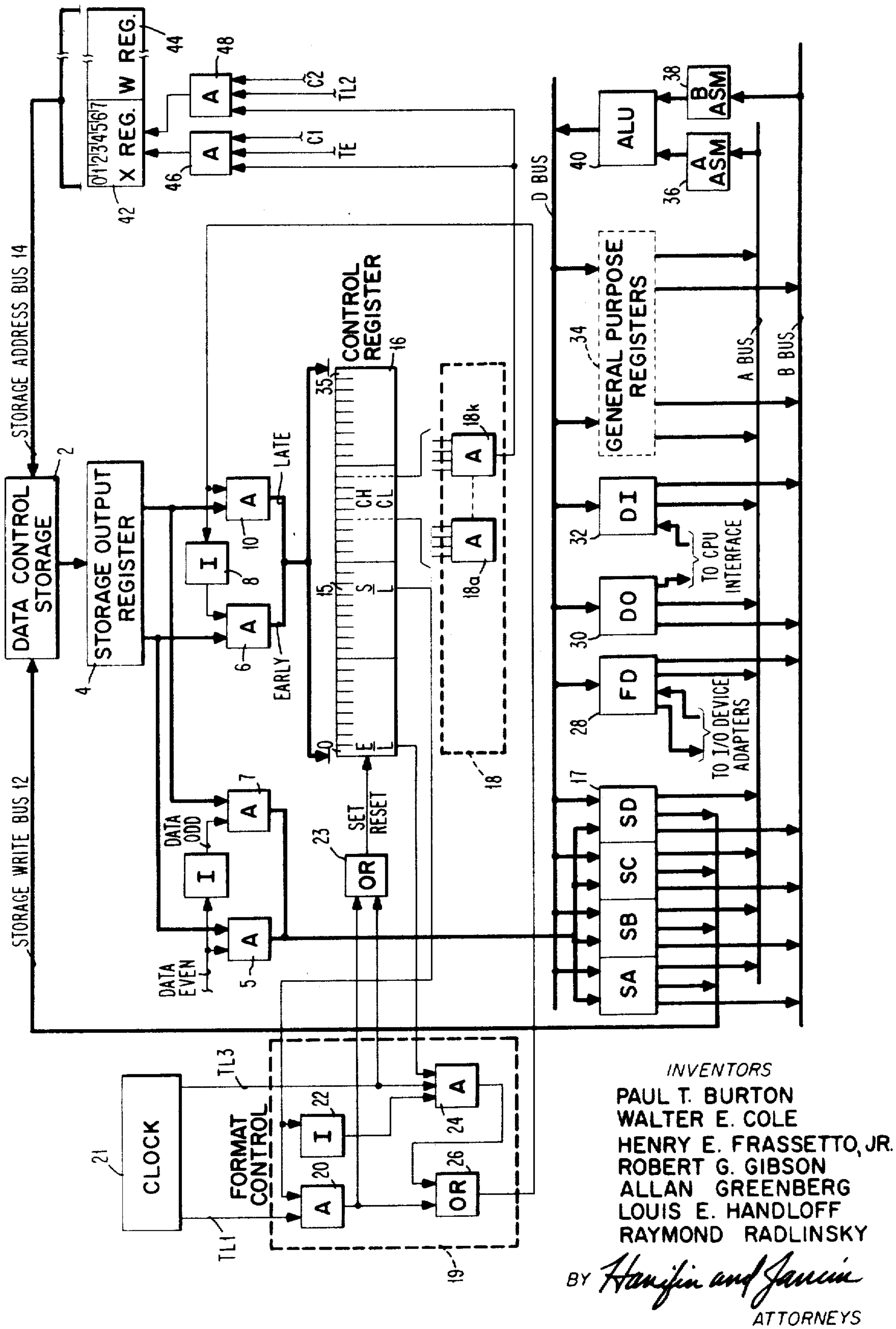
INVENTORS
PAUL T. BURTON
WALTER E. COLE
HENRY E. FRASSETTO, JR.
ROBERT G. GIBSON
ALLAN GREENBERG
LOUIS E. HANDLOFF
RAYMOND RADLINSKY
BY Hanifin and Jancin
ATTORNEYS

MICROPROGRAMMED COMMON CONTROL UNIT WITH DOUBLE FORMAT CONTROL WORDS

BACKGROUND OF THE INVENTION

1. Field of the Invention

This invention is in the field of microprogramming control of common control units which are interposed between central processors and their input/output devices such as magnetic disk files, card readers and the like.

2. Description of the Prior Art

Microprogram control of common control unit operation is known in the art. However, in order to facilitate understanding of this invention, a brief description of such control will be given.

The common control unit microprogram is a set of instructions which responds to commands from a central processor in accordance with a user's program instructions to control the transfer of data between I/O devices and the main storage of a data processing system. Specifically, each control unit cycle is controlled by a microprogram word. These words are stored generally in a read-only store or a writeable control store included with the control unit. Thus, the microprogram is a program which directly controls the gates and control lines during a machine cycle.

The microprogram, consisting of a plurality of microprogram (or control) words, each containing a plurality of fields, controls the data flow and performs other control functions. An address field, included as one of the fields within the control word indicates the address of the next control word. The addressed control word is read out from the control storage means to a control register. The word contained in the control register is decoded to control the data flow and other functions.

Present common control unit microprograms are designed around a fixed length microprogram word. With such systems, each control (or machine) cycle causes the entire microprogram word to be read out regardless of the number of fields actually used for that particular cycle. Some fields are used quite extensively while others not as frequently. For example, it is known that the fields used most frequently include those which control, respectively, the arithmetic logic unit, input and output of the arithmetic logic unit, branching and the addressing of the subsequent microprogram word.

Many disadvantages are realized with the use of a fixed length control word. Much of the control storage space is wasted since each control word contains all of the fields associated with the word. Additionally, the control register, which stores the control word before it is decoded, must store all of the bits of each microprogram word though only a portion of the microprogram word is needed. Finally, extensive decoding circuitry is necessary. Decoding circuitry, associated with each of the fields, decodes the information stored in the control register and applies the control signals to the various operating components of the common control unit. These decoders may take the form of AND/OR gates and their outputs are selectively gated by timing pulses.

SUMMARY OF THE INVENTION

In more recently introduced common control units for I/O (input/output) devices of a data processing system, the tendency is to provide micro-coded logic within the control unit to relieve the central processing unit of the system from performing many of the repetitive operations for transferring data between the I/O devices and the processor's main storage.

The improved microprogrammed common control unit of the present application is characterized by a control word format divided into two halves, which can be utilized as a single long control word or alternatively two short control words. The selection of a long or short control word for executing micro-operations within the control unit is determined to a large extent by the particular type of I/O device currently operating.

The format of the data being transferred between an I/O device and its common control unit, the rate at which data is transferred and/or the control function(s) which must be performed will determine whether or not the short control word format can be used or whether the long format is required.

Different control unit users will use different mixes (percentage of long to short words) depending upon their particular requirements.

In the preferred embodiment, two short control words require the same amount of space in the control store as one long word. During readout of control store, the accessing mechanism always reads out a portion of control store equal in length to a long word and this readout can consist of one long word or two short words. Either short word can be individually gated to a control register for execution during a control unit cycle of operation.

During the execution of each long control word, a first portion of the control word is gated into the control register for execution during an early portion of a control unit cycle and the remaining or second portion of the long control word is thereafter transferred to the control register for execution during a second portion of the control unit cycle.

Predetermined binary bits in each control word determine (1) which of two short control words will be selected for execution during the next succeeding cycle when two short words have been accessed from control store, and (2) effect transfer of the second portion of a long control word to the control register after the first portion has been executed.

In order to make the long/short word format arrangement feasible within a control unit, it is necessary that the selected short word field format has a sufficient frequency of use so as to provide sufficient cost savings, particularly in control store size requirements. The more short format words used, the greater the control store savings.

With the double format concept, it is possible to store two short words in the storage space required for one long word. By placing into the first half of the microprogram word format those fields which are most frequently used, the second half of the storage space for the microprogram word is often not needed for control unit operation during a cycle. When not needed, this portion of the control storage space may be used to store another control word.

Such a double formating concept allows for more efficient use of the microprogram storage means, a reduction in size of the control register and the data bus between the storage means and the register, and sharing control decoders by assigning more than one control word field to the same decoding circuits.

How these advantages are realized will become apparent following a reading of the detailed description of the preferred embodiment of this invention set forth below.

Implementation of the double format concept is accomplished through the use of logic circuitry, activated by two significant bits contained in the control words, which cause the selection of the proper portion of an addressed microprogram word. The operation of the logic circuitry and its functional relationship to the significant bits will become more apparent with the description of the preferred embodiment of the invention.

BRIEF DESCRIPTION OF THE DRAWINGS

The FIGURE is a fragmentary diagrammatic illustration including logic circuitry illustrating the shared decoder arrangement and double format control of data flow as well as the circuitry's relationship to a control unit.

DETAILED DESCRIPTION OF THE PREFERRED EMBODIMENTS

The preferred embodiment of the invention will be described with reference to a microprogram stored in a control store of a common control unit.

With reference to the Figure, a preferred embodiment of a combination data and control storage unit 2 is in the form of a writeable storage unit containing both the microprogram and data. Data flow for the storage unit is designed around a 72-bit (long format) microprogram control word. Thus each time that the storage unit 2 is accessed during a read cycle by means of X and W address registers 42, 44 and a storage address bus 14, 72 bits are transferred from the storage unit 2 to a storage output register 4. Thus the output register 4 can store a long format control word, two short format control words or 72 bits of data.

Each half (36 bits) of the storage output register 4 is connected to a respective one of the AND gates 6 and 10. The AND gates 6 and 10 each represent 36 AND gates, each bit position in the register 4 having an output coupled to one of these 72 AND gates. Each of the bit positions in the register 4 is also coupled to a respective one of a plurality of 72 AND gates arranged in 2 groups represented by AND circuits 5 and 7. The AND gates 6 and 10 are utilized to transfer control word bits from the register 4 to a 36-bit control register 16 whereas the AND gates 5 and 7 are utilized to transfer data from the output register 4 to a 36-bit register 17 (SA, SB, SC, SD).

The 72-bit long format microprogram control word described above is divided into first and second portions. During a control word execution cycle the first portion is transferred from the output register 4 into the control register 16 for execution by way of the AND gate 6. Later in the same cycle the second portion of the long format control word is transferred from the output register 4 to the control register 16 for execution by way of the AND circuit 10.

During short format control word execution cycles, only one of two short format control words is transferred from the register 4 to the register 16.

A first significant bit in a current control word, stored in register 16 for execution, signals format control circuitry 19 (to be described) that a long or short format control word is being executed during the cycle. In addition, another significant bit in the current control word together with the first significant bit indicate to the format control circuitry whether it is the early portion of a next addressed long format word or the first or second of two short format words which is to be transferred to the register 16 for execution during the next succeeding cycle.

The selection in the preferred embodiment of the choice of 72- and 36-bit long and short format control words is for purposes of illustration only for it will be appreciated that microprogram words of other lengths and relative lengths can be used.

The outputs of the bit positions of the control register 16 are connected to conventional decode circuits 18, two of which 18a and 18k are shown. The format control circuit 19 is functionally a part of the decode circuits 18; however, it has been illustrated separately for clarity of explanation since it is a significant part of the present improvement.

The function of the format control circuit 19 is to selectively control the AND circuits 6 and 10 and an inverter circuit 8 during one cycle of operation to gate the first portion of a next accessed long format word from the output register 4 to the control register 16 for the next machine cycle or to gate either one of a pair of accessed short format control words from the output register 4 to the control register 16. It is also effective during the execution of the first portion of a long format control word to transfer the second portion of the word from the output register 4 to the control register 16 by way of the AND circuit 10.

The common control unit also includes a plurality of general purpose registers 34, a file data register 28 which is used to transmit data to and receive data from I/O device adapters. A pair of registers 30 and 32 are similarly used to communicate with the central processing unit (not shown) via its interface for the transfer of data between the main storage unit (not shown) associated with the central processing unit and the common control unit. Data is transferred to and from the central processing unit via the registers 30 and 32 respectively. Thus the common control unit acts as a data buffer between the I/O devices and the main storage unit. Communication between the various registers and the housekeeping update operations are effected by an ALU (arithmetic and logic unit) 40 and its associated A and B bus assemblers 36 and 38.

A typical example of data flow will be described. Data received from one of the I/O devices such as a disk file is transferred into the register 28 serially by byte (8 bits). This data can be transferred directly to the processing unit by way of the 8-bit A bus or B bus, the A or B bus assemblers 36, 38, the ALU 40, the 8-bit D bus and register 30. Alternatively, this data can be temporarily stored in the storage unit 2 via the path described immediately above except that it is transferred from the D bus to one of the 4 registers illustrated at 17 and the 36-bit storage write bus 12. If this data has been transferred into the storage unit 2 and it is later desired to transfer the data to the processing unit, it will be transferred from the storage unit 2 to one of the registers 17 via the AND circuit 5 or 7 and then to the A or B bus, the A or B bus assemblers 36, 38, the ALU 40, the D bus and register 30.

Data is transferred from any one of the general purpose registers 34, the register 17 or the storage unit 2 to an I/O device over a path similar to that described above including the A or B bus, the A or B bus assembler 36, 38, the ALU 40, the D bus and the file data register 28. Generally similar paths are used for transferring data to and from the processing unit via the registers 30, 32, the A, B and D buses, the ALU 40 and its assemblers 36, 38.

It will be appreciated that the various gating functions which are required during the execution of microprogram control words to effect the data transfers described above are under the control of timing pulses from clock 21 and gating pulses from decode circuits 18 which in turn respond to the control word bits in the control register 16.

Each bit position of the register 16 is preferably of the type referred to as a polarity hold latch which has data applied to one input thereof and set/reset signals applied to another input thereof. When the set/reset signal is changed from one level (reset) to another level (set) for a short interval, the latch assumes a logical state corresponding to the input data. When the set/reset signal returns to said one level, the latch is latched up in the logical state which it has assumed during the "set" interval.

The use of the E/L (early/late) and S/L (short/long) bits in the long and short format control words to control the gating from the storage output register 4 to the control register 16 will now be described in greater detail. For ease of illustration, an example of suitable long and short word formats is set forth below.

| REG. 16: Bit positions | 0 | | 7 | 8 | | | 15 | | 17 | 22 | 25 | 26 | | 35 |
|---|---|---|---|---|---|---|---|---|---|---|---|---|---|---|
| Short word | E L | OP | CD | P | CA | | S L | K | P | CX | CH | P | CK (CB, CW) | P |
| Long word (early) | OP | | MD | P | CA | | S L | K | P | CX | CH | P | CK (CB, CW) | P |
| Long word (Late) | E L | | CD | P | CS | | O | | P | MD | CL | P | MK | P |

In the example above, different control word bit groups are assigned various functions, for example the bit group OP meaning "Operation Code" refers to those bits which determine the primary operation to be effected by the particular control word, such as add, move data, read, write, etc. The control word bits which are effective to implement the present improvement are the S/L and E/L bits. Note that the S/L bit is shown in bit position 15 of the short word and bit position 15 of the first portion of the long word. This bit is set to logical zero in a short word and a logical one in a long word. Note that in the corresponding bit position 15 in the second portion of the long word this bit is always set equal to a logical zero for reasons which will be described below.

The E/L bit occurs in bit position zero of the short word format and in bit position zero of only the second portion of the long format word. With particular reference to the Figure, it will be seen that the bit position zero of register 16 which stores the E/L bit is coupled to one input of an AND circuit 24 of the format control circuit 19. Bit position 15 of the control register 16 which stores the S/L bit is coupled to an AND circuit 20 and is coupled to a second input of the AND circuit 24 by way of an invert circuit 22. A line TL1 from the clock 21 forms a second input to the AND circuit 20 and a line TL3 from the clock 21 forms a third input to the AND circuit 24.

A short timing pulse on line TL1 and the S/L bit are effective toward the end of the execution of the first portion of each long format word (S/L equals one for long format words) to produce an output from the AND circuit 20 which in turn causes the OR circuit 26 to apply a logical one signal to the AND circuit 10 to gate the second part of the long format word from the output register 4 to the inputs of the control register 16. A set/reset pulse is applied by OR circuit 23 to the S/R line to set the register 16 in accordance with the input bits.

During the execution of each short word, the S/L bit has been set equal to logical zero inhibiting and AND circuit 20 and the set/reset signal when the clock signal is applied to the line TL1.

During the execution of each long and short format control word, the address registers 42 and 44 are set in a manner well known in the art for selecting the next control word to be executed and for transferring that control word from the control storage portion of the storage unit 2 into the storage output register 4. In the common control unit of the present application, however, this next control word may be one long format word or alternatively either one of two short format control words. Thus the first portion of a long format word which has been transferred to the output register 4 must be transferred into the control register 16, or either one of two short format words transferred into the output register 4 must be transferred to the control register 16 for the next machine cycle. To control this transfer the E/L and S/L bits together with the format control circuit 19 are used together with the AND gates 6 and 10 and the inverter 8. The timing for the transfer is effected by a clock pulse from the clock 21 being applied to the AND circuit 24 via line TL3. This clock pulse occurs toward the end of the current machine cycle (after registers 42, 44 access the next control word from unit 2) to prepare for the next machine cycle.

First assume that the current control word is a short format word whereby the S/L bit is equal to a logical zero. This logical zero bit is inverted by the circuit 22 to apply a logical one input to the AND circuit 24. The E/L bit will determine which 36-bit group in the output registers 4 will be transferred to the control register 16. The E/L bit will have been set equal to logical zero by the microprogrammer in the event that the next microprogram word in the particular microprogram routine being executed is a long format control word or alternatively the first of two short format words. With E/L equal to logical zero the output of the AND circuit 24 and that of the OR circuit 26 will be logical zero whereby the inverter circuit 8 will apply a logical one signal to the AND gate 6 to gate the first 36 bits stored in the output register 4 to the input data lines of control register 16. A set/reset pulse applied to the S/R line of the register 16 sets the register 16 in accordance with the data bits at its input lines.

However, in the event that the next control word in the microprogram routine being executed is the second of the two format control words accessed from the storage unit 2 and transferred into the output register 4, then the microprogrammer will have set the E/L bit to a logical one. When the timing pulse is applied to TL3, it produces logical one output signals from the AND circuit 24 and the OR circuit 26 to cause the AND gate 10 to transfer the second short format word to the input data lines of the control register 16. A set/reset pulse on the S/R line sets the word into the register 16 for execution of the next machine cycle.

Attention is again directed to the fact that, in the event that the current control word being executed as described above is a long word, the E/L bit is effective for controlling the AND gate 24 only during the execution of the second or late portion of the long format word. This is the period in time during which the clock 21 applies a timing pulse to the line TL3. During the earlier execution of the first or early portion of the long word this bit position included one of the OP code bits which was utilized by other portions of the decode circuits 18 for control functions.

It has been indicated above that another of the benefits of the present improvement feature, whereby first and second portions of a long format word are consecutively decoded and executed, is the sharing of the same decode circuits by two different fields in the first and second portions of the long format word. The sharing of the same decode device by two fields at different times is accomplished by means of the clock timing pulses.

An example of this decode circuit sharing feature is given with respect to the early and late long word fields CH and CL and one of the decode AND circuits 18k. The CH and CL fields are utilized for control word branching functions and respectively set the X3 and X4 bits of the register 42 in accordance with the logical value of selected common control unit conditions C1 and C2.

A pair of AND circuits 46 and 48 have their outputs connected as inputs to the X3 and X4 bit positions of the register 42. The decode AND circuit 18k which decodes one of the 4-bit combinations of the CH and CL fields has its output coupled as an input to each of the AND circuits 46 and 48. The machine condition lines C1 and C2 are connected as inputs to the AND circuits 46 and 48 respectively. Timing control pulses are applied to the lines TE and TL2 which form inputs respectively to the AND circuits 46 and 48.

A clock timing signal is applied to the line TE during the early portion of a machine cycle during which a short format word or the first portion of a long format control word is being executed. The clock 21 applies a timing signal to the line TL2 at a later interval only during that portion of the machine cycle during which the second part of the long format control word is being executed. The timing signal is applied to the line TL2 subsequent to the time interval during which a clock pulse is applied to the line TL1 associated with the format control circuit 19 to transfer this second part of a long format control word into the register 16.

Thus during the execution of a long format control word, the AND circuit 18*k* is assumed to have decoded a predetermined bit combination in the field CH and partially prepares the AND circuit 46. Subsequently, the timing pulse is applied to the line TE, which causes the AND circuit 46 to "sample" the machine condition on line C1, i.e., if C1 is at the logical zero state, a logical zero is entered into the X3 bit of the register 42 and if C1 is at a logical one state, a logical one condition is entered into the X3 bit. If subsequently during the execution of the second part of the control word, the same predetermined bit combination exists in the CL field causing the AND circuit 18*k* to be rendered effective, it will partially prepare the AND circuit 48. When the timing pulse is thereafter applied to the line TL2, the AND circuit 48 will "-sample" the machine condition on line C2, i.e., bit X4 of the register 42 will be set to the logical zero or one state in accordance with the logical state on line C2. In this manner, the AND circuit 18k is shared by the CH and CL fields of the first and second portions of certain long word formats to effect the testing of branch conditions for selecting the low order address bits of the data or control word to be accessed from the storage unit 2.

In this regard attention is directed to the fact that although the CH and CL fields are illustrated as being of equal length in the preferred embodiment, the sharing of decode circuits can be achieved in situations where two fields are of different lengths. It will also be appreciated that in some instances it may be desirable that the ratio of the long to short word length may be greater than two in which event the E/L and/or the S/L fields may require more than one bit position.

Although not specifically a part of the present improvement, another example of sharing of decode circuits is illustrated in the above word format example with respect to CK, CB, CW fields. Depending upon the logical zero or one state of the K field of the bit position 16, either the CK field or alternatively the CB and CW fields are decoded for different functions.

While the invention has been particularly shown and described with reference to the preferred embodiment thereof, it will be understood by those skilled in the art that various changes in form and detail may be made therein without departing from the spirit and scope of the invention.

What is claimed is:

1. In a data processing system, a micro-programmed common control unit for controlling the transfer of data between the system main storage and input/output devices, comprising a control storage unit having a plurality of bit positions arranged in groups of equal size for storing in each group a long format control word or alternatively a predetermined number of short format control words, each of the control words having control field bits including certain control field bits representative of its long or short format and indicative of the next control word to be accessed for execution during the next succeeding cycle, addressing apparatus effective during control word execution cycles for accessing selected ones of said groups of bit positions to read out a long format control word or alternatively a predetermined number of short format control words for the execution of a desired control word during the next control word execution cycle, a control register for receiving control field bits and having a storage bit capacity equal to the number of bit positions in a short format word, and control word execution apparatus responsive to control field bits in the control register and including first means responsive to said certain control field bits during a late portion of each control word execution cycle for gating into the control register the next desired control word in the event that it is a short format word or alternatively a selected portion of the next desired control word in the event that it is a long format word, and second means responsive to at least one of said certain control field bits during an earlier portion of each long format control word execution cycle for gating each remaining portion of the long format word into the control register in sequence for sequential execution of succeeding portions of the long format word.

2. The common control unit of claim 1 wherein two short format words are equal in size to one long format word, and wherein said certain control field bits are equal in number to two and are contained in each short format word, the bit representative of the long or short format being contained in the first executed portion of each long format word and the other certain bit occurring in the subsequently executed portion of each long format word.

3. The common control unit of claim 2 wherein the first executed portion of each long word is characterized by the short/long format bit being a predetermined binary value, and wherein the corresponding bit position in the subsequently executed portion of each long format word is always characterized by a predetermined binary value which is the complement of the binary value of the short/long format bit.

4. In a microprogrammed common control unit operated cycle by cycle in response to microprogrammed control words of two formats, the combination comprising a control storage unit for storing a plurality of microprogrammed control words of said two formats, each of said control words containing indicators as to its format, said two formats comprising a long word format and a short word format respectively with a predetermined number of short format words being equal in size to one long format word and said indicators comprising significant bits contained in said short format words and in different portions of said long format words, a control register having a capacity for accommodating only a short format word or a predetermined portion of a long format word including their respective significant bits, and means responsive to said significant bits in said control register for causing the transfer of either a selected short format word from said control storage unit to said control register during one cycle or for consecutively transferring successive portions of each long format word to the control register during one cycle when said short and long word formats respectively are indicated.

5. The common control unit of claim 4 wherein two short format words are equal in size to one long format word, and wherein said significant bits are equal in number to two and are contained in each short format word, and in the long format word the long/short bit being contained in the first transferred portion of the word and the other bit occurring in the subsequently transferred portion of the word.

6. The common control unit of claim 5 wherein the first transferred portion of each long word is characterized by the short/long format bit being a predetermined binary value, and wherein the corresponding bit position in the subsequently transferred portion of each long format word is characterized by a fixed binary value which is the complement of the binary value of the short/long format bit.

* * * * *

UNITED STATES PATENT OFFICE
CERTIFICATE OF CORRECTION

Patent No. 3,673,575 Dated June 27, 1972

Inventor(s) Paul T. Burton et al

It is certified that error appears in the above-identified patent and that said Letters Patent are hereby corrected as shown below:

In The Abstract:

Line 16 after "second" insert --part of the--

Signed and sealed this 2nd day of January 1973.

(SEAL)
Attest:

EDWARD M. FLETCHER, JR.
Attesting Officer

ROBERT GOTTSCHALK
Commissioner of Patent